US011308397B2

(12) United States Patent
Sorokin

(10) Patent No.: US 11,308,397 B2
(45) Date of Patent: Apr. 19, 2022

(54) SYSTEM AND METHOD OF TRAINING A NEURAL NETWORK

(71) Applicant: Ilya Sorokin, Naples, FL (US)

(72) Inventor: Ilya Sorokin, Naples, FL (US)

( * ) Notice: Subject to any disclaimer, the term of this patent is extended or adjusted under 35 U.S.C. 154(b) by 705 days.

(21) Appl. No.: 16/274,319

(22) Filed: Feb. 13, 2019

(65) Prior Publication Data

US 2019/0258934 A1    Aug. 22, 2019

Related U.S. Application Data

(60) Provisional application No. 62/631,586, filed on Feb. 16, 2018.

(51) Int. Cl.
*G06N 3/08* (2006.01)
*G06N 3/04* (2006.01)

(52) U.S. Cl.
CPC .............. *G06N 3/084* (2013.01); *G06N 3/04* (2013.01); *G06N 3/088* (2013.01)

(58) Field of Classification Search
CPC ........... G06N 3/084; G06N 3/088; G06N 3/04
See application file for complete search history.

(56) References Cited

U.S. PATENT DOCUMENTS

| 2003/0061030 A1* | 3/2003 | Kuboyama | G06F 40/268 704/9 |
| 2016/0283842 A1* | 9/2016 | Pescianschi | G06N 3/04 |

OTHER PUBLICATIONS

Ellefsen et al., "Neural Modularity Helps Organisms Evolve to Learn New Skills Without Forgetting Old Skills", Apr. 14, 2015, PLOS Computations Biology, pp. 1-24 (Year: 2015).*

* cited by examiner

*Primary Examiner* — Paulinho E Smith
(74) *Attorney, Agent, or Firm* — Anna Vishev

(57) ABSTRACT

A modified model of the Rosenblatt perceptron and learning method leading to a significant increase in the intelligence and learning speed of the Rosenblatt perceptron itself, as well as arbitrary neural network topologies based on it, based on the modified error correction method and the modified "Back propagation" algorithm. To increase the manageability of the perceptron topology, as well as the processes of recognition and learning, the cost of connection is added at the synapses in addition to the weighting factor. To increase the speed of the perceptron learning, first, at least at the initial stage of learning, the process is moved from nested recursive iterations of learning on different layers of synapses of perceptron to successive learning for different layers; and, second, the process is moved from the constant rate of learning parameter, which requires a sequence of small iterations when adjusting the weights, to the functional parameter of the learning speed, correcting the weight so that the error for the current image is compensated completely in one step.

27 Claims, 3 Drawing Sheets

SYSTEM AND METHOD OF TRAINING A NEURAL NETWORK

CROSS-REFERENCE TO RELATED APPLICATIONS

This Application is a non-provisional application from and claims all rights of priority to U.S. Provisional Patent Application No. 62/631,586, filed on Feb. 16, 2018. The '586 Application is incorporated herein by reference.

BACKGROUND OF THE INVENTION

Certain aspects of the present disclosure generally relate to machine learning and, more particularly, to artificial neural networks (ANN) and to improving systems and methods of configuring and training ANNs.

An artificial neural network, which may comprise an interconnected group of artificial neurons, is a computational device or represents a method to be performed by a computational device.

In a monograph published in 1962 by Frank Rosenblatt [1], the definition of perceptron was given, both in the simplest form, and with numerous modifications. In the future, the perceptron in the definition of Rosenblatt will be called simply a perceptron. In its simplest form, the perceptron is a network consisting of three layers of units: a layer of sensory units at the input (S-units), a layer of response units at the output (R-units) and a hidden layer of association units between them (A-units).

Moreover, the simplest perceptron, as defined by Rosenblatt, contains at least two layers of successive links (synapses) that go only from S- to A-units, as well as from A- to R-units and form the variable interaction matrix (W). In any case, as shown in FIG. 1, each perceptron contains layers of S- and R-units and, at least, one layer of A-units.

The operation of a separate formal neuron is described by the model shown in FIG. 2, in which the input signals ($x_i$) enter the neuron through connections (synapses), characterized by the weights (one for each individual synapse). Thus, the neuron calculates the weighted sum of the input signals:

$$s = \sum_{i=1}^{n} x_i w_i \quad (1)$$

The neuron can be linear, that is, where the weighted sum of input signals is the output signal of the neuron itself.

In addition, the output of the neuron can be calculated as a function of the weighted sum of the input signals. This function is called the activation function. This function can be described by different models. For example, this function can be a threshold (shown in FIG. 3a) or linear (shown in FIG. 3b). For multilayer perceptrons, a nonlinearity is more often used, for example, a sigmoidal function described by a logistic function:

$$y_k = f(s_k) = \frac{1}{1+e^{-s_k}} \quad (2)$$

where $s_k$ is the weighted sum of all the synaptic inputs of the neuron-k; and $y_k$ is the output of the neuron-k (as shown in FIG. 3c).

A-units can form a variety of topologies with connections of any type: sequential, lateral, recurrent, etc. Perceptrons can be fully connected, that is, each of the S-units forms connections with all A units, and each A-unit forms connections with all R-units, or incompletely connected with thinned connections. Thus, the topology of the perceptron is given by the rigid discrete structure of connections between individual neurons.

S-A connections of the simplest perceptron can be fixed, and do not change in the process of perceptron training. Such relationships can be pre-initialized according to pre-defined rules. In another case, S-A connections can be modified in the process of perceptron training.

Learning a neural network is a process in which the parameters of a neural network are configured in such a way that the input images are associated with certain output images. The learning algorithm is determined by the method of adjusting the parameters.

There are many algorithms for learning perceptrons. For example, for the Supervised Learning the following is often used:

Error-Correction Learning [2].

According to this method the output signal of the neuron-k ($y_k$) is compared with the desired response ($d_k$). The result is an error signal ($e_k$):

$$e_k = d_k - y_k \quad (3)$$

The error signal initializes the control mechanism, the purpose of which is to apply a sequence of adjustments to the neuron-k synaptic weights. The process of successive corrections leads to a step-by-step approach of the output signal $y_k$ to the desired $d_k$. Step-by-step adjustment of the synaptic weights of the neuron-k continues until the system reaches a steady state, and the synaptic weights are stabilized. At this point the learning process stops.

Minimization of errors in the learning process is carried out according to the Widrow-Hoff rule (delta-rule):

$$\Delta w_{kj}(n) = \eta e_k(n) x_j(n) \quad (4)$$

Where $w_{kj}(n)$ is the current value of the synaptic weight $w_{kj}$ of the neuron-k corresponding to the input signal $x_j(n)$, at step n; $e_k(n)$ is the current value of the error signal in step n; and $\eta$ is some positive constant, the learning rate parameter, which determines the rate of learning.

Thus, the adjustment applied to the synaptic weight of the neuron is proportional to the product of the error signal of the input signal that caused it.

The weight correction is done by adding the obtained value $\Delta w_{kj}(n)$ to the initial value of the weight:

$$w_{kj}(n+1) = w_{kj}(n) + \Delta w_{kj}(n) \quad (5)$$

This algorithm makes corrections taking into account only the contribution of the output signal to the formation of the error. Other features of the output signal, for example, position on the curve of the activation function, are not taken into account.

Learning by the Method of Back Propagation [3].

According to this method:

$$\Delta w k_j(n) = \eta \delta_k(n) x_j(n) \quad (6),$$

where $\eta$ is some positive constant, the learning rate parameter, which determines the rate of learning; $x_j(n)$ is the input signal-j of the neuron-k at step n; and $\delta_k(n)$ is the local gradient of the neuron-k at step n.

For R-units:

$$\delta_k(n) = e_k(n) \varphi_k'(s_k(n)) \quad (7),$$

where $e_k(n)$ is the current value of the error signal in step n; $s_k$ is the weighted sum of all synaptic inputs of the neuron-k; and $\varphi'_k$ is the derivative of the activation function of the neuron-k taken from the weighted sum of all synaptic inputs.

Thus, in contrast to the correction method (4), the current rate of change of the activation function (7) is taken into account in calculating the correction of the weights and the error is distributed over the weights of different neurons in proportion to the derivative of the activation function taken from the weighted sum of the signals.

For A-units:

$$\delta_k(n) = \varphi'_k(s_k(n)) \Sigma_k \delta_i(n) w_{ik}(n) \quad (8),$$

where $s_k$ is the weighted sum of all the synaptic inputs of the neuron-k; $\varphi'_k$ is the derivative of the neuron activation-k function taken from the weighted sum of all synaptic inputs; $\Sigma_k \delta_i(n) w_{ik}(n)$ (9) is the sum of the products of the parameters related to the neurons that directly connect to the neuron-k, where $\delta_i(n)$ is the local gradient of the neuron-i of the next layer at step n; $w_{ik}(n)$ is the current value of the synaptic weight $w_{ik}$ of the connection between neurons -k and -i at step n.

Thus, the sum (9) performs for the A-units the role of the current value of the error signal in step n.

The weight correction is done by adding the obtained value $\Delta w_{kj}(n)$ to the initial value of the weight:

$w_{kj}(n+1) = w_{kj}(n) + \Delta w_{kj}(n)$ and this formula is the same as (5).

Unlike the method of error correction, back propagation makes adjustments already taking into account the output signal (considering derivative of the activation function). This increases the flexibility and intelligence of learning, however, as in the case of the error correction method, the learning rate parameter η, being a small value constant, leads to a slow iterative process of gradual approach of the output signal $y_k$ to the desired response $d_k$.

Another serious drawback of this approach is the mutual dependence of different layers of synapses in the learning process: first the output layer is corrected, then the backward propagation of the error leads to an adjustment of the overlying layer, which changes the input signals of the underlying layer and leads to the need to re-adjust its synapses. This leads to the nested iterative process (shown in FIG. 4), to the exponential growth of learning time, depending on the number of layers, and, as a consequence, to the "curse of the dimension" of perceptrons, which is particularly pronounced in Deep Neural Networks (DNN).

For Unsupervised Learning, for example, the generic Generalized Hebbian Algorithm (GHA) [4] is often used. This algorithm is closely related to the algorithms used in statistics (Factor Analysis and Principal Components Analysis). According to the GHA method, the linear neuron model is considered:

$$y = \Sigma_{i=1}^{m} x_i w_i \quad (10),$$

where $w_{ji}(n)$ is the current value of the synaptic weight $w_{ji}$ of the neuron-j corresponding to the input signal $x_i(n)$, at step n; m is the dimension of the input vector X (n); and $y_j(n)$ is the activity of the neuron-j (output) at step n.

There is just one layer of such neurons, forming synapses with inputs. The training sample contains only input images. The training is done according to the modified Hebb rule:

$$\Delta w_{ji}(n) = \eta y_j(n)[x_i(n) - \Sigma_{k=1}^{i} w_{ki}(n) y_k(n)] \quad (11),$$

where η is the learning rate parameter; i=1, 2, . . . , m; j=1, 2, . . . , l, where l is the required number of main components (outputs).

Training continues until the synaptic weights $w_{ji}$ reach their steady-state values. The GHA algorithm reveals the main components of the input images but does not take into account the mutual (lateral) influence of the neurons.

SUMMARY OF PROPOSED INVENTION

In accordance with a general aspect of the present invention, the learning process is divided into three consecutive stages, i.e., the stage of self-organization, the associative correction stage with a modified error correction method, and the correction stage performed using the classical method of back propagation.

In accordance with a more specific aspect of the present invention, during the stage of self-organization, training of all layers of synapses, except synapses with R-units (output layer), is performed as unsupervised learning, that is self-organization with the extraction of essential features (main components) of all input images of the layer. Moreover, a complete cycle of training of the first layer is carried out, right up to the stabilization of the weights. Then, for a full package of input images, a packet of output images of the trained (self-organized) first layer is formed. The output images of the first layer are the input images for the second layer. Then, a full cycle of training of the second layer is made. Further, if the second layer is not a layer of R-units, then training is also done as unsupervised learning. Only training of the last layer of R-units is based on supervised learning, that is, the input images of this layer are the output images of the overlying layer, and the desired output images are the desired output images of the perceptron itself. This approach allows its user to move from the nested iterative process, so called nested loops, shown in FIG. 4, to successive cycles, shown in FIG. 5, that is, from the complexity of the order $O(n^k)$, where k is the number of nested loops, to the complexity of the order O(n). This allows the user to change from the power law dependency of the learning time on the number of layers to the linear one. It also allows the user to escape from the "curse of dimension".

The correction of the weights of the self-organizing layers (except R-units) in the first stage is preferably carried out by the Modified Generalized Hebb Algorithm (MGHA) (detailed below), which enhances the intelligence of the Unsupervised Learning. However, the self-organization of the upper layers can be accomplished with other Unsupervised Learning algorithms, for example, using the classical GHA, or Self-Organizing Map (SOM).

In accordance with another specific aspect of the present invention, in the second stage, correction of the weights of the layer of R-units is performed by a modified method of error correction (detailed below), which dramatically increases the learning rate.

In accordance with another specific aspect of the present invention, in the final stage, if the weights at the previous stages are stabilized, but the acceptable level of error is not reached, the training can be continued from the achieved error level up to the stabilization of the weights by the existing classical methods, such as back propagation, for example.

BRIEF DESCRIPTION OF THE DRAWINGS

The invention is illustrated by way of examples which are not a limitation, and the figures of the accompanying drawings in which references denote corresponding parts, and in which.

DETAILED DESCRIPTION

Cost of Connection

Figure 6:
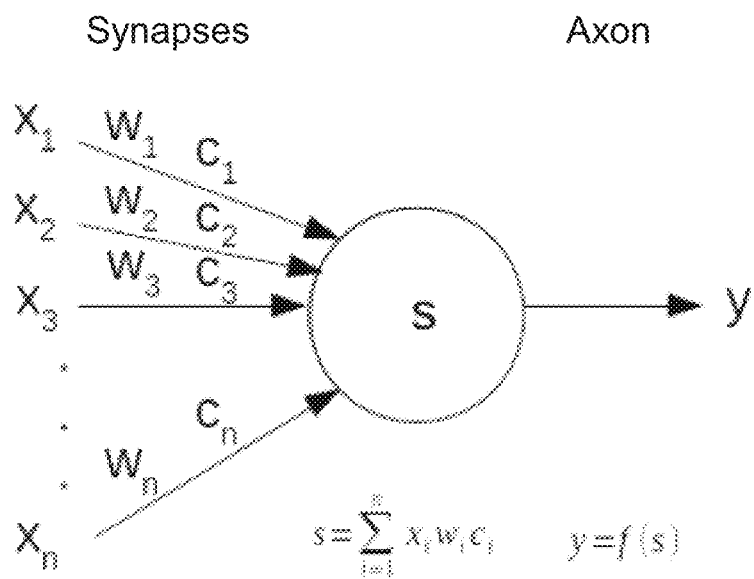
FIG. 6 is a model of neo-perceptrons neuron, wherein $x_i$ are input signals, $w_i$ are weights, $c_i$ is cost of the connections, s is the weighted sum of the input signals, and y are output signals.

To increase flexibility in describing the perceptron topology, as well as to increase the controllability of the learning and recognition process, it is suggested to add a measure of the cost of the $c_i$ connection (FIG. 6), in addition to the weighting coefficient $w_i$ for each synapse in the neuron model.

Thus, the weighted sum of signals of such a neuron is described as follows:

$$s = \Sigma_{i=1}^{n} x_i w_i c_i \qquad (12)$$

Figure 1:
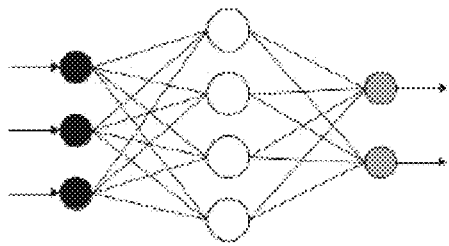
FIG. 1 is a logical scheme of an elementary perceptron, wherein S-units are sensory units at the input; A-units are association units; and R-units are response units at the output.
Figure 2:
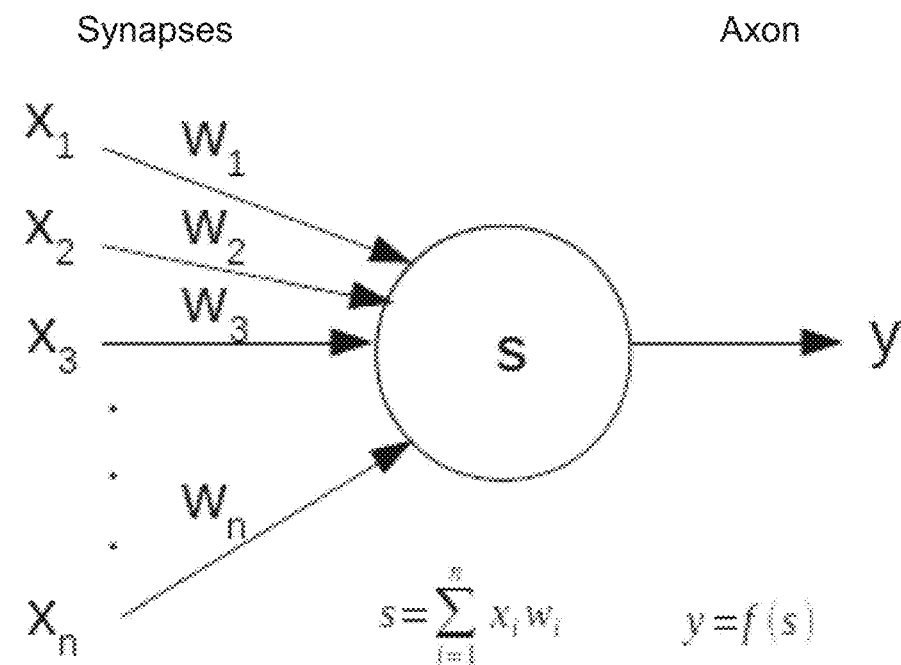
FIG. 2 is a model of formal neuron, wherein $x_i$ are input signals, $w_i$ are weights, s is a weighted sum of the input signals, and y are output signals.
Figure 3A:
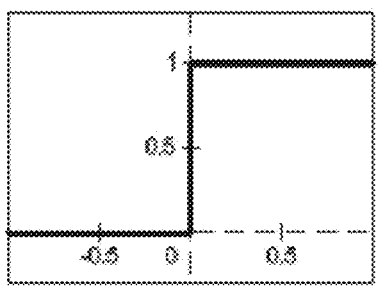
FIG. 3a is the threshold activation function.
Figure 3B:
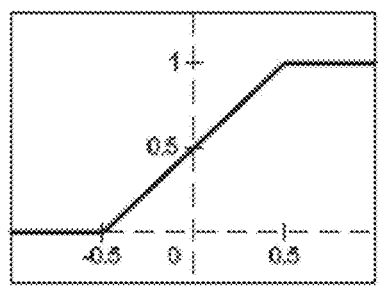
FIG. 3b is the linear activation function.
Figure 3C:
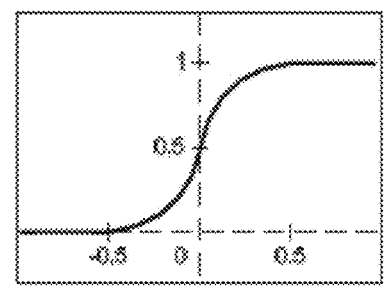
FIG. 3c is the sigmoidal activation function.
Figure 4:
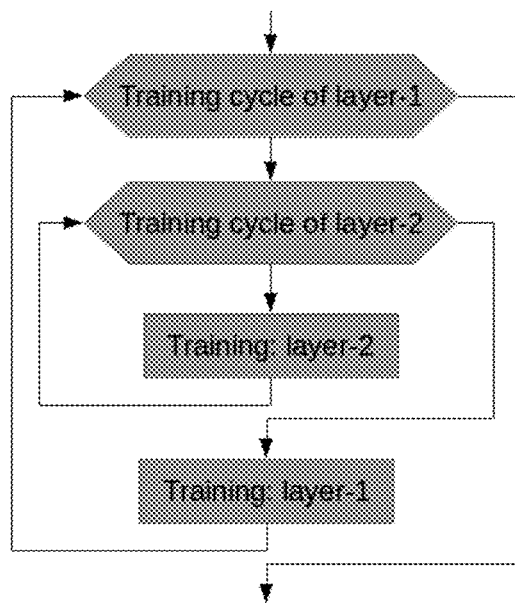
FIG. 4 illustrates the nested iterative process, i.e., the nested loops.
Figure 5:
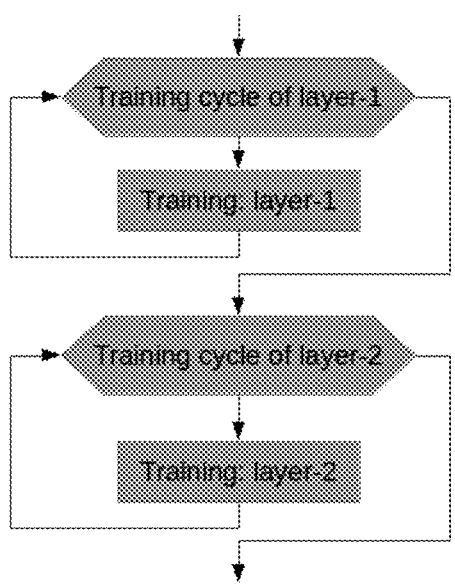
FIG. 5 illustrates the successive process, i.e., the successive loops.

For $c_i=1$ for any i, the model degenerates into a classical rigid neuron model (FIG. 2).

Figure 7:
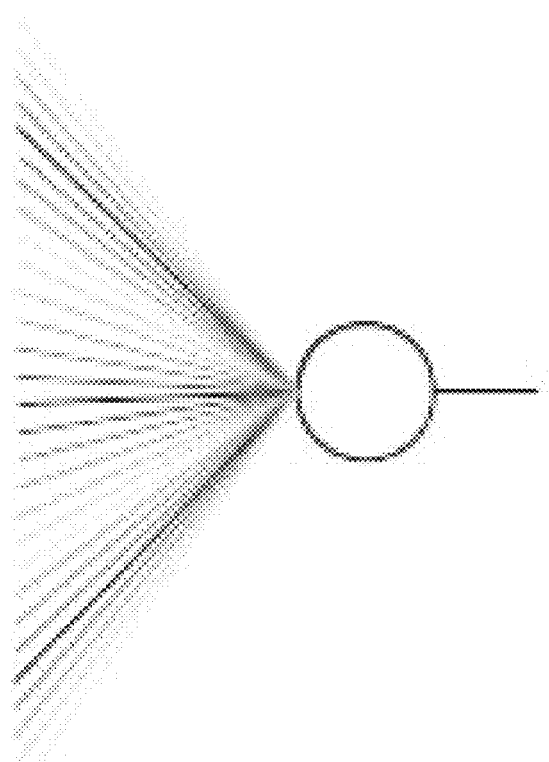
FIG. 7 illustrates gradient (with an infinite number of possible fractional values) topologies generated using the cost of connection.

The cost of connection allows users of the present method to simulate not only discrete topologies (the presence of a link ($c_i=1$) or its absence ($c_i=0$)), but also gradient ones (with an infinite number of possible fractional values). In this case, the learning process of the perceptron affects weights ($w_i$), but does not change the cost of connections ($c_i$). Thus, connection is not just "be" or "not be." The connection can, for example, "be rather than not be" or vice versa (FIG. 7). As a result, it is possible, for example, to control the effect of the localization of a neuron, the degree of its physical remoteness from the overlying neuron, with which the neuron forms a synapse.

The cost of connection allows not only to model the topology of the connections, but also reflects, for example, the physical features of the individual elements of the circuit, which are the physical embodiment of the weights. For example, the heterogeneity of the memristor characteristics within a single chip can be taken as the distribution of heterogeneous measures of the cost of connections. The proposed method takes into account this heterogeneity of the connections and distributes the weight adjustments in proportion to the cost of connections. Thus, the proposed method makes it possible to train a perceptron implemented on memristor chips, even if the inconsistent quality of such chips is unacceptable in other areas, such as digital memory.

It is possible to use more than one measure of cost per connection in such a way that:

$$s = \Sigma_{i=1}^{n} x_i w_i [\Pi_{j=1}^{k} c_{ij}] \qquad (13),$$

where k is the number of different cost groups $c_{ij}$ for synapse-i.

In this case, it becomes possible for "hormonal" control of the perceptron, when a group of measures of the cost of connection is modified in the course of work, affecting simultaneously the groups of neurons, without adjusting the weights $w_i$.

Modified Method of Error Correction (MMEC).

The described method replaces the constant learning rate parameter $\eta$, which determines the rate of learning, by the amount calculated for each synapse in such a way that the error $e_k$ for the neuron-k will be distributed among all the neuron-k synapses for one operation of adjusting the weights, that is, in just one step, in contrast to other algorithms, where correction of the error requires a number of successive corrections. Such an adjustment of all the images from the training sample is one epoch. The training is repeated until the weights stabilize, that is, the rate of error reduction drops to such a level that additional training is no longer needed.

$\Delta w_{ki}(n)$ at step n is calculated according to the Widrow-Hoff rule (delta rule):

$$\Delta w_{ki}(n) = \eta e_k(n) x_i(n) \qquad (14).$$

However, unlike learning by the method of error correction, where $\eta$ is some positive constant, in the present method:

$$\eta = \frac{c_{ki}}{\sum_{j=1}^{m} c_{kj} x_j}, \qquad (15)$$

where $c_{ki}$ is the cost of connection-i of the neuron-k; and m is the number of synapses of the neuron.

In training, the influence of the $c_{kj}$ connection cost on the adjustment is normalized by the ratio to the sum of the total cost of all neuron-k connections. In the same way, the effect of the input signal $x_j$ is normalized by the ratio to the sum including all the input signals of the neuron-k. In the case of application of groups of connection costs:

$$\eta = \frac{\prod_{q=1}^{l} c_{kiq}}{\sum_{j=1}^{m} \left[\prod_{q=1}^{l} c_{kjq}\right] x_j}, \qquad (16)$$

where l is the number of different measures of the cost of connection at one synapse; $c_{kiq}$ is the cost-q of the connection-i of neuron-k.

The adjustment applied to the synaptic weight of the neuron is proportional to the multiplication of the signal error by the connection cost and by the input signal that caused it, and is inversely proportional to the sum of the products of the neuron-k input signal by the cost of connection. Thus, when learning a modified correction method, the error of one image in one step is completely distributed among all the synapses, and, in proportion to the input signals and the values of the connections:

$$\sum_{i=1}^{m} \Delta w_{ki}(n) = \sum_{i=1}^{m} \eta e_k(n) x_i(n) = \sum_{i=1}^{m} \frac{c_{ki}}{\sum_{j=1}^{m} c_{kj} x_j} e_k(n) x_i(n) = e_k. \qquad (17)$$

Correcting the errors of different images can be done successively or in batches, that is, adding up the adjustments for all the images from the training sample, taking from the sum the average for the entire sample, and adjusting the weights for the obtained average of the sample adjustments.

The operation of learning based on modified method of error correction is repeated until the system reaches a steady state, that is, the stage at which the synaptic weights are practically stable.

Such an approach to calculating the learning rate parameter leads to a rapid redistribution of the error between neuron synapses, in contrast to the gradual approach to the required value of the weights by fine pitches determined by the traditional algorithms.

Modified Generalized Hebbian Algorithm (MGHA).

As mentioned above, the Generalized Hebbian Algorithm (GHA) considers the linear neuron model (10). In the proposed MGHA, it is necessary to consider a linear neuron model that takes into account the cost of connection:

$$y = \Sigma_{i=1}^{n} x_i w_i c_i \tag{18}$$

The scales are corrected according to the modified algorithm (11), taking into account the cost of connection:

$$\Delta w_{ji}(n) = \eta y_j(n)[c_j x_i(n) - \Sigma_{k=1}^{j} c_{ki} w_{ki}(n) y_k(n)] \tag{19}$$

MGHA, like GHA, allows to restore the original image from the output image and the matrix of the weights. This makes it possible to apply one more method for estimating the learning error—the deviation of the restored input image from the original one. By the rate of change of this error, one can judge the convergence of training and the level of stabilization of weights.

The GHA algorithm does not take into account the mutual (lateral) influence of neurons, therefore, at MGHA it is proposed to complete each stage of weight adjustment (19) with the following operation:

1. A sample of output images is formed for the entire training sample.

2. The output sample is converted in accordance with one of the methods, taking into account the mutual influence of the output signals. For example, using Gaussian smoothing.

3. The obtained transformed output sample is considered to be the desired output images and one learning epoch is used for the learned layer of neurons by a modified method of error correction.

Then, the epoch is repeated using MGHA and steps 1-3 of learning by a modified method of error correction.

Training is repeated until the balance is stabilized or the initial input images deviate from the restored input images.

Final Adjustment of Weights.

In the event that the learning outcomes obtained during the auto-adaptation phase do not meet the requirements, the training of the neural network can be continued from the achieved error level by one of the traditional methods, for example, by error correction or by the back propagation algorithm.

In the preceding specification, the invention has been described with reference to specific exemplary embodiments thereof. It will however, be evident that various modifications and changes may be made thereto without departing from the broader spirit and scope of the invention as set forth in the claims that follow. The specification and drawings are accordingly to be regarded in an illustrative manner rather than a restrictive sense.

REFERENCES

[1] Rosenblatt, F. (1962) Principles of neurodynamics. Perceptrons and the theory of brain mechanisms. 616 pp. Washington, Spartan Books, 1962

[2] Haykin, S. (1999) Neural Networks. A Comprehensive Foundation. Second Edition, chapter 2.2 Error-correction learning (pp 73-75) Prentice Hall, Inc., 1999

[3] Haykin, S. (1999) Neural Networks. A Comprehensive Foundation. Second Edition, chapter 4.3 Back-propagation algorithm (pp 183-195) Prentice Hall, Inc., 1999

[4] Sanger, T. D. (1989). Optimal unsupervised learning in a single-layer linear feedforward neural network. Neural Networks 2 (6): 459-473.

I claim as follows:

1. A method of training a neural network having at least one neuron, the method comprising:
    assigning a weight and a cost of connection to each signal inputted into said at least one neuron, wherein said cost of connection is any value between two predefined values; and
    training said at least one neuron in a single step using a variable learning rate parameter to correct weights of said signals, said variable learning rate parameter being dependent on said assigned cost of connection, such that an error for a particular neuron is distributed among all synapses of said particular neuron.

2. The method of claim 1, wherein said assigned cost of connection comprises a group of costs of connection.

3. The method of claim 1, wherein said cost of connection is any value between 0 and 1.

4. The method of claim 1, further comprising self-organizing said neural network by performing training of all layers of synapses except synapses with R-units as unsupervised learning.

5. The method of claim 4, wherein said self-organizing is performed with extraction of essential features of all input images of a particular layer.

6. The method of claim 5, wherein during said self-organizing a complete cycle of training of a first layer is carried out right up to stabilization of weights.

7. The method of claim 6, wherein output images of a particular layer are input images for a subsequent layer, unless said particular layer is a layer of R-units.

8. The method of claim 1, further comprising performing a final correction using a method suitable for error corrections.

9. The method of claim 8, wherein said final correction is performed using a back propagation method.

10. An apparatus for training a neural network having at least one neuron, the apparatus comprising:
    a memory; and
    at least one processor coupled to the memory, the at least one processor being configured to assign a weight and a cost of connection to each signal inputted into said at least one neuron, wherein said cost of connection is any value between two predefined values; and to train said at least one neuron in a single step using a variable learning rate parameter to correct weights of said signals, said variable learning rate parameter being dependent on said assigned cost of connection, such that an error for a particular neuron is distributed among all synapses of said particular neuron.

11. The apparatus of claim 10, wherein said assigned cost of connection comprises a group of costs of connection.

12. The apparatus of claim 10, wherein said cost of connection is any value between 0 and 1.

13. The apparatus of claim 10, wherein said at least one processor is further configured to self-organize said neural network by performing training of all layers of synapses except synapses with R-units as unsupervised learning.

14. The apparatus of claim 13, wherein said at least one processor is further configured to perform said self-organizing with extraction of essential features of all input images of a particular layer.

15. The apparatus of claim 14, wherein said at least one processor is further configured to carry out a complete cycle of training of a first layer right up to stabilization of weights.

16. The apparatus of claim 15, wherein during said self-organization, output images of said particular layer are input images for a subsequent layer, unless said particular layer is a layer of R-units.

17. The apparatus of claim 10, wherein said at least one processor is further configured to perform a final correction using a method suitable for error corrections.

18. The apparatus of claim 10, wherein said at least one processor is further configured to perform said final correction using a back propagation method.

19. A non-transitory computer-readable medium having encoded thereon program code for training a neural network having at least one neuron, the program code being executed by a processor and comprising:
- a first program code to assign a weight and a cost of connection to each signal inputted into said at least one neuron, wherein said cost of connection is any value between two predefined values; and
- a second program code to train said at least one neuron in a single step using a variable learning rate parameter to correct weights of said signals, said variable learning rate parameter being dependent on said assigned cost of connection, such that an error for a particular neuron is distributed among all synapses of said particular neuron.

20. The non-transitory computer-readable medium of claim 19, wherein said assigned cost of connection comprises a group of costs of connection.

21. The non-transitory computer-readable medium of claim 19, wherein said cost of connection is any value between 0 and 1.

22. The non-transitory computer-readable medium of claim 19, further comprising a third program code to self-organize said neural network by performing training of all layers of synapses except synapses with R-units as unsupervised learning.

23. The non-transitory computer-readable medium of claim 22, wherein said third program code further comprises a program code to perform said self-organization with extraction of essential features of all input images of a particular layer.

24. The non-transitory computer-readable medium of claim 23, wherein said third program code is configured to carry out a complete cycle of training of a first layer right up to stabilization of weights.

25. The non-transitory computer-readable medium of claim 24, wherein said third program code is further configured to enter output images of said particular layer as input images for a subsequent layer, unless said particular layer is a layer of R-units.

26. The non-transitory computer-readable medium of claim 19, further comprising a fourth program code configured to perform a final correction using a method suitable for error corrections.

27. The non-transitory computer-readable medium of claim 26, wherein said fourth program code is configured to perform said final correction using a back propagation method.

* * * * *